(12) United States Patent
Fry et al.

(10) Patent No.: US 10,755,301 B2
(45) Date of Patent: Aug. 25, 2020

(54) USING A SOCIAL NETWORK TO ENHANCE TARGETED DIGITAL CONTENT PRESENTATION

(71) Applicant: INTERNATIONAL BUSINESS MACHINES CORPORATION, Armonk, NY (US)

(72) Inventors: Jonathan Fry, Fishkill, NY (US); Kathleen Chalas, Wappingers Falls, NY (US); Lahiruka Winter, Fishkill, NY (US); Cameron Tidd, Goshen, NY (US); Alexander Leventhal, Wappingers Falls, NY (US); John Houston, Hopewell Junction, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 275 days.

(21) Appl. No.: 15/823,917

(22) Filed: Nov. 28, 2017

(65) Prior Publication Data

US 2019/0164190 A1    May 30, 2019

(51) Int. Cl.
*G06Q 30/00* (2012.01)
*G06Q 30/02* (2012.01)
*G06Q 50/00* (2012.01)

(52) U.S. Cl.
CPC ..... *G06Q 30/0245* (2013.01); *G06Q 30/0203* (2013.01); *G06Q 30/0251* (2013.01); *G06Q 30/0254* (2013.01); *G06Q 30/0269* (2013.01); *G06Q 50/01* (2013.01)

(58) Field of Classification Search
CPC .................................................. G06Q 30/0251
USPC .............................................................. 705/14
See application file for complete search history.

(56) References Cited

U.S. PATENT DOCUMENTS 9,213,981 B2    12/2015   Angani et al.
9,270,778 B1    2/2016    Brown
9,842,349 B2 *  12/2017   Sawczuk ................ G06Q 50/01
(Continued)

OTHER PUBLICATIONS

Hansson, Linnea; Wrangmo, Anton; Klaus Solberg Soilen, Optimal Ways for Companies to Use Facebook as a Marketing Channel, May 24, 2013, Emerald Group Publishing Limited (Year: 2013).*
(Continued)

*Primary Examiner* — Matthew L Hamilton
(74) *Attorney, Agent, or Firm* — Edward Wixted; Matthew M. Hulihan; Heslin Rothenberg Farley & Mesiti PC

(57) ABSTRACT

A method for enhanced digital content presentation is provided that includes assigning, to each member of members of a social network of a user, a respective knowledge score, the knowledge score being representative of accuracy in the member predicting positive impressions of the user. The members of the social network are surveyed for an indication of which one or more options for digital content are expected to have a positive impression on the user. Based on the surveying, selected digital content based on the one or more options that are expected to have a positive impression on the user, as indicated by the surveying, is selected. The selected digital content is presented to the user. An indication of whether the selected digital content had a positive impression on the user is received from the user.

13 Claims, 10 Drawing Sheets

(56) References Cited

U.S. PATENT DOCUMENTS

| | | | | |
|---|---|---|---|---|
| 2010/0262658 | A1* | 10/2010 | Mesnage | G06Q 10/06 |
| | | | | 709/204 |
| 2012/0271884 | A1* | 10/2012 | Holmes | G06Q 30/02 |
| | | | | 709/204 |
| 2013/0339445 | A1* | 12/2013 | Perincherry | H04L 67/306 |
| | | | | 709/204 |
| 2014/0164978 | A1* | 6/2014 | Deeter | G06F 3/0481 |
| | | | | 715/774 |
| 2014/0189530 | A1* | 7/2014 | Anand | H04L 65/403 |
| | | | | 715/753 |
| 2016/0011729 | A1 | 1/2016 | Flores et al. | |
| 2017/0249669 | A1* | 8/2017 | High | G06Q 30/0261 |

OTHER PUBLICATIONS

Anderson, A., et al., "Effects of User Similarity in Social Media", WSDM'12, Feb. 2012, Seattle, WA, 10 pgs.

Cheng, W., "Collaborative Filtering Recommendation on Users' Interest Sequences", PLoS One 11(5): e0155739, May 19, 2016, 17 pgs.

Arora, A., et al., "Method and System for Surfacing Suitable Content to Users based on Contextual Reputation", IP.com No. IPCOM000213556D, Dec. 21, 2011, 3 pgs.

Mell, Peter, et al., "The NIST Definition of Cloud Computing", NIST Special Publication 800-145, Sep. 2011, Gaithersburg, MD, 7 pgs.

\* cited by examiner

USING A SOCIAL NETWORK TO ENHANCE TARGETED DIGITAL CONTENT PRESENTATION

BACKGROUND

Targeted advertising to certain demographic groups based on data-mined aggregated data can deliver positive ad impressions of products, services, and brands. These advertisements ("ads") generally target specific demographic groups within a population to which the subject matter of the ads are predicted to be statistically relevant. Often times these targeted ads are delivered to specific targeted users of social networking sites, such as Facebook or Twitter.

However, data mining techniques are limited in that they cannot access information that individuals have not shared or otherwise supplied as part of the data being mined. Such information might include sensitive or confidential information, for instance. Such information, referred to herein as a user's "offline backstory" or "backstory", is present for virtually all social network users, though they tend not to explicitly post such information on social network sites for obvious reasons. Accordingly, certain ads that are statistically likely to be useful or positively welcomed by many users of a particular demographic may in fact leave a negative impression with a targeted user of that demographic when the statistical predictions are at odds with the user's backstory.

SUMMARY

Shortcomings of the prior art are overcome and additional advantages are provided through the provision of a computer-implemented method. The method includes assigning, to each member of members of a social network of a user, a respective knowledge score, the knowledge score being representative of accuracy in the member predicting positive impressions of the user. The members of the social network are surveyed for an indication of which one or more options, of several options for digital content, are expected to have a positive impression on the user. Based on the surveying, selected digital content based on the one or more options that are expected to have a positive impression on the user, as indicated by the surveying is selected. The selected digital content is presented to the user. An indication of whether the selected digital content had a positive impression on the user is received from the user.

Further, a computer program product including a computer readable storage medium readable by at least one processor and storing instructions for execution by the at least one processor is provided for performing a method. The method includes assigning, to each member of members of a social network of a user, a respective knowledge score, the knowledge score being representative of accuracy in the member predicting positive impressions of the user. The members of the social network are surveyed for an indication of which one or more options, of several options for digital content, are expected to have a positive impression on the user. Based on the surveying, selected digital content based on the one or more options that are expected to have a positive impression on the user, as indicated by the surveying is selected. The selected digital content is presented to the user. An indication of whether the selected digital content had a positive impression on the user is received from the user.

Yet further, a computer system is provided that includes a memory and a processor in communication with the memory, wherein the computer system is configured to perform a method. The method includes assigning, to each member of members of a social network of a user, a respective knowledge score, the knowledge score being representative of accuracy in the member predicting positive impressions of the user. The members of the social network are surveyed for an indication of which one or more options, of several options for digital content, are expected to have a positive impression on the user. Based on the surveying, selected digital content based on the one or more options that are expected to have a positive impression on the user, as indicated by the surveying is selected. The selected digital content is presented to the user. An indication of whether the selected digital content had a positive impression on the user is received from the user.

Additional features and advantages are realized through the concepts described herein.

BRIEF DESCRIPTION OF THE DRAWINGS

Aspects described herein are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
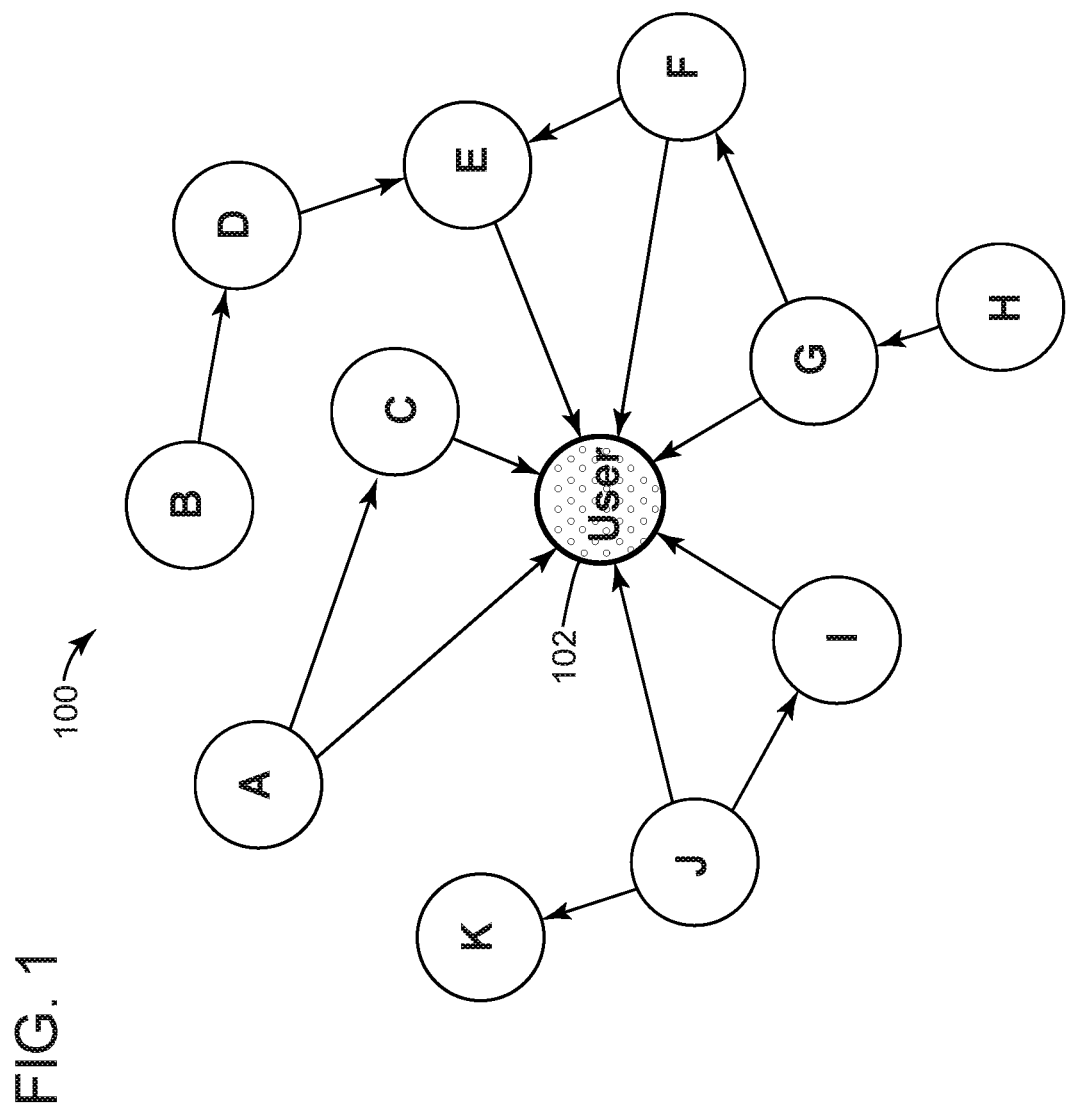
FIG. 1 depicts a social network graph of a social network of a user.

As noted, targeted advertising or other targeted forms of digital content presentation may be based on aggregating data using data mining techniques. From aggregated data, statistical predictions can be made as to which digital content would be expected to have a positive impression on individuals within specific demographic group(s). For example, it can be predicted that certain individuals of a particular age range and marital status are likely to be interested in digital advertisements for certain types of products or services.

However, individuals of any demographic group can be expected to have confidential or proprietary information (offline back-stories) that cannot be readily accessed through data mining techniques. It is possible that these back-stories conflict to some extent with the statistical predictions as to which subjects or types of various products, services, interests, etc., when presented to the user in digital content, would be expected to have a positive impression on the targeted individuals. For example, it may not be publicly known that a particular individual targeted for advertisements of a particular category of products is actually struggling with a health condition that is incompatible with that category of products. In another example, a recent major life event of an individual, such that an advertisement that was previously applicable to the individual is no longer applicable, may not be reflected by the data mining. Under those circumstances, certain advertisements could give the targeted individual a negative impression, leading to various consequences to the advertiser, for instance damage to the advertiser's brand.

As such, there is a desire to reduce the incidences of negative impressions caused from targeted advertising based on statistical predictions and demographic profiling techniques. Further there is a desire for methods to extract additional information from a targeted user's social network, which additional information can more accurately predict a user's expected impression from an advertisement or other digital content, thereby potentially avoiding situations in which a user experiences a negative impression to an advertisement. In particular, there is a desire for such a method of predicting whether a targeted advertisement will have a positive or negative impression on a user based on a user's offline back-story, even if the back-story remains confidential. Such knowledge can also be used to enhance a seed data product (statistical data mining/aggregated data on individuals, etc.) and create a more valuable data set that is more accurate in predictive capability.

Targeted individuals in a demographic group often develop their own social networks (i.e. collection of contacts, friends, connections, or the like) on, for example, one or more social network sites. Such individuals, herein referred to as users, frequently communicate with several other members of their social network through such social network sites.

The user will have various types of relationships with the other members of the social network and those members will have various degrees of knowledge in/of the user and/or the user's back-story. For example, a user may have a professional relationship with some of the members, and some of the members may be relatives of the user. Additionally, some of the members may only be casually acquainted with the user, and some, such as the user's best friend, may know the user intimately.

Advantageously, by virtue of their various relationships to the user, and their various degrees of knowledge of the user, many of the members of the user's social network may have knowledge of some or all of a user's back-story. Accordingly, the combined knowledge of the members within a user's social network about the user can be utilized to enhance the accuracy of statistical predictions as to what digital content would have a positive impression on the user if presented to him or her.

In accordance with aspects described herein, methods are presented that can apply such combined knowledge to assist in the process of delivering accurately targeted advertisements and other forms of digital content to a user of a social network. The methods may be used as an additional filter that can be applied to statistically-selected advertisements targeted for the particular user. The methods more accurately predict which advertisements would leave a positive impression on the user and help to avoid selecting advertisements that are likely to leave a negative impression on the user.

Methods of utilizing a user's social network to enhance the accuracy of targeted advertisements (or other digital content), which are predicted to have a positive impression on the user, are provided in accordance with aspects described herein and described initially with reference to FIGS. 1-6.

An example method begins, with reference to FIG. 1, by determining an initial social network graph 100 of a social network for a user 102. The user's social network graph 100 may be determined using any of a variety of mining techniques and/or other software tools. In some examples, backend data of a social network platform is accessed to automatically, by computer processing, process the data and ascertain and identify the members of the user's social network. In some examples, this data is already maintained by social networks in the form of database linkages and/or associations between members, for instance. Additionally or alternatively, this information can be mined from the back-end data to ascertain any information not otherwise already maintained in the data set.

In the embodiment of FIG. 1, the social network graph 100 includes a plurality of members A, B, C, D, E, F, G, H, I, J and K (collectively members A-K). The arrows connecting the members represent the connections, friendships, groupings, linkages, 'follows', direct communication links, or the like, through which the members are generally connected and/or communicate with each other within the social network.

At this stage of the method, the degree of knowledge of each member A-K about the user 102 is not well known to the system and the members A-K have not yet been assigned a knowledge score representative of accuracy in a member A-K predicting positive impressions of the user 102.

Figure 2:
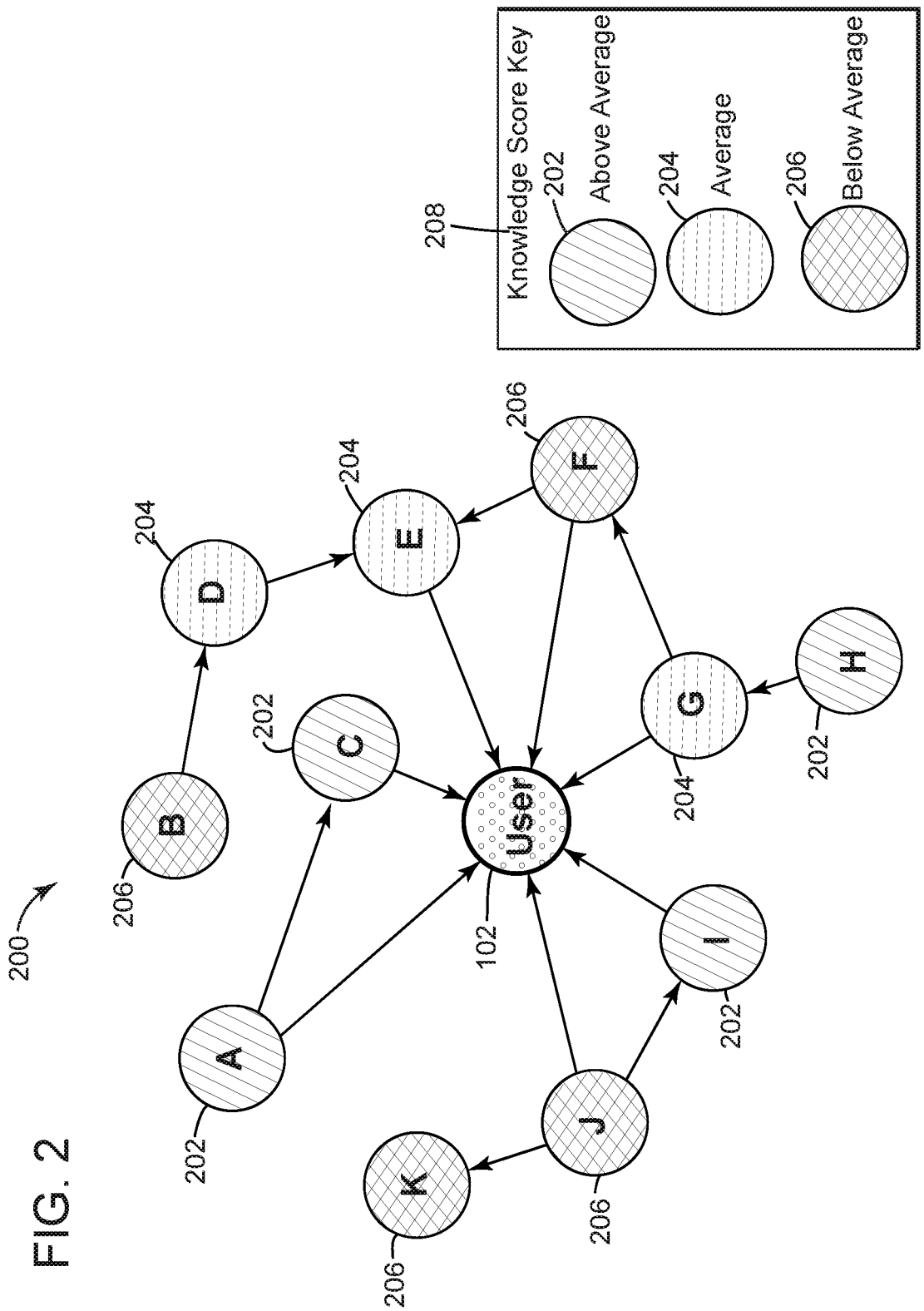
FIG. 2 depicts a social network graph of the social network of the user, where members of the social network have each been assigned a knowledge score, according to aspects described herein.

Referring to FIG. 2, a social network graph 200 of the social network of the user 102 is depicted, where the members A-K have been assigned knowledge scores, specifically 'ideal' knowledge scores 202, 204, 206. The 'ideal' knowledge scores 202, 204, 206 represent the underlining true ranking of accuracy in each member's capability of predicting positive impressions of the user, i.e. predicting whether the user will have a positive impression when presented particular digital content.

In this ranking system (illustrated in the Knowledge Score Key 208), the following three rankings are used:
Reference number 202 (i.e., the slanted solid parallel lines), represents that the member knows the user very well and has an above average knowledge of the user.
Reference number 204 (i.e., the horizontal dashed parallel lines), represents that the member has an average knowledge of the user.
Reference number 206 (i.e., the crosshatched lines), represents that the member does not know the user very well and has a below average knowledge of the user.

It is noted that this is just one example of a knowledge score assignment/ranking system, and any other system may be used. In this case, members A, C, H and I have an above average knowledge of the user 102 and each have a true knowledge score of 202. Members D, E, and G have an average knowledge of the user 102 and each have a true knowledge score of 204. Finally, the members B, F, J and K have a below average knowledge of the user 102 and each have a true knowledge score of 206.

Though this simplified example shows only three grades of knowledge scores (above average 202, average 204 and below average 206), any number of graduations may be utilized for a ranking system. For example, the knowledge score may vary from 1 to 100, for a more granular ranking on the degree of knowledge a member has in the user.

Additionally, a knowledge score ranking system may vary depending on such factors as the subject matter of selected digital content to be presented to the user or the relationship type between the user and a member. For example, the knowledge score assigned to a first member, who has a professional relationship with the user, may be ranked (or weighted) higher than the knowledge score of a second member, who has a personal relationship with the user, if the subject matter of the selected digital content was work related. Conversely, the knowledge score assigned to the second member may be ranked (weighted) higher than the knowledge score of the first member if the subject matter of the selected digital content was personal in nature and not work related. Additionally or alternatively, knowledge scores may be a multidimensional or domain/categorically restricted. That is, a knowledge score assigned to a member may be representative of the member's knowledge for one category or domain (accuracy in predicting positive impressions of the user for that category/domain) or may be a composite knowledge score for multi dimensions (i.e. multiple domains/categories).

This social network graph 200 represents the case of 'ideals', where the rankings represent the actual true knowledge that each member has of the user. However, though this ideal ranking is a goal to be strived for, in reality it may not always be practically achievable.

Figure 3:
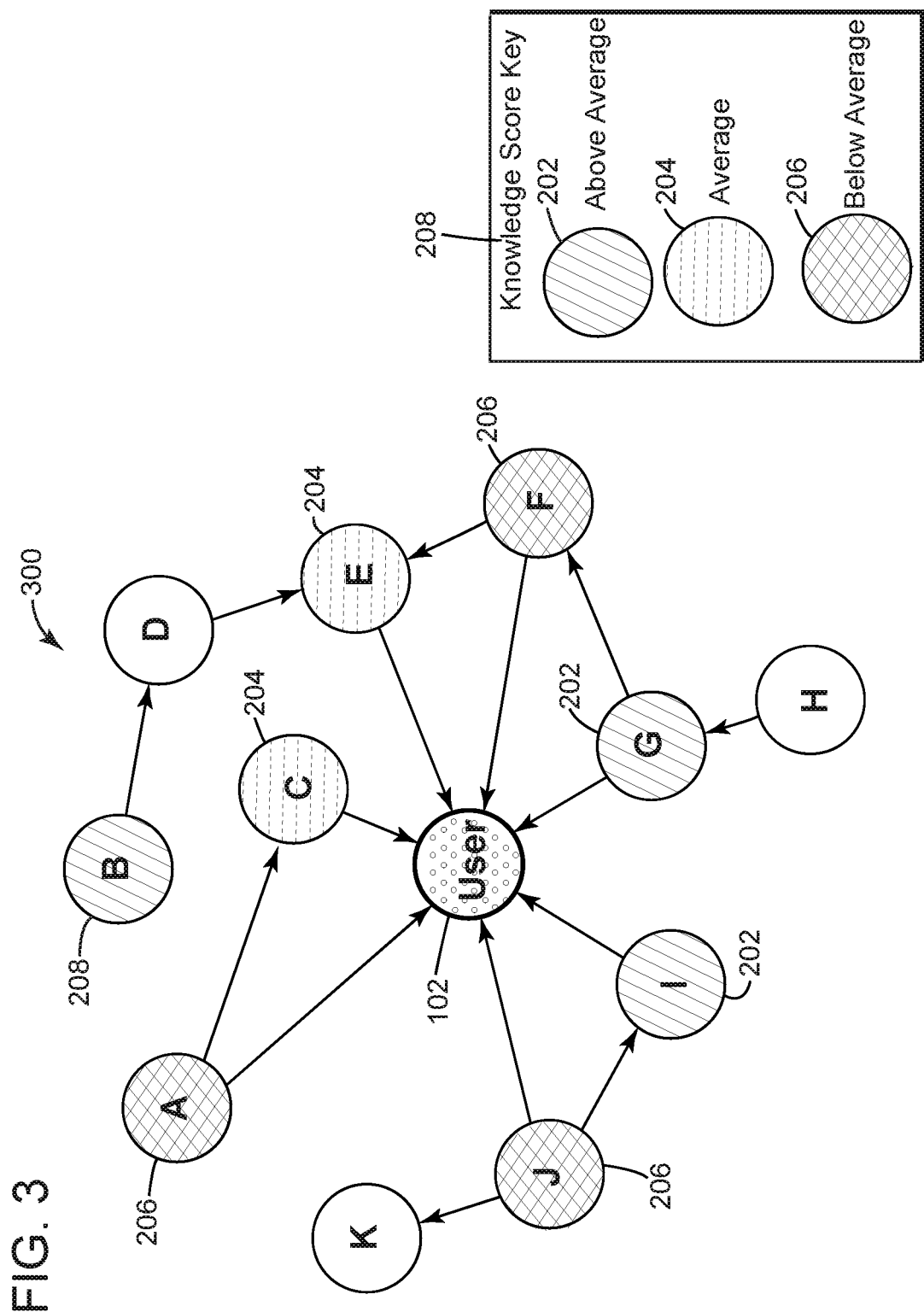
FIG. 3 depicts a social network graph of the social network of the user, where members have been assigned an initial knowledge score, according to aspects described herein.

Referring to FIG. 3, a social network graph 300 of the social network of the user 102 is depicted, where each member A-K, of the plurality of members of the social network of the user 102, has been assigned a respective knowledge score (an initial knowledge score). The initial knowledge score may be based on statistical data mining applied to the social network. The statistical data mining provides an initial indication of accuracy in a member A-K predicting positive impressions of the user 102. The data mining might consider posts, 'likes', and other interactions that members have with the social network in assessing the accuracy of that member in identifying positive impressions of the user.

Additionally, using similar data mining techniques, a respective relationship type between the user 102 and each member A-K may also be initially assigned to each member A-K. For example, the relationship types may include a professional type relationship, a personal type relationship or a family type relationship. Such relationship types may be ascertained by any of various methods, for instance by analyzing data of the social network itself to identify how the two are connected.

In this initial case, members B, G and I have been statistically predicted to have an above average knowledge of the user 102 and each have been assigned an initial knowledge score of 202. Members C and E have been statistically predicted to have an average knowledge of the user 102 and each have been assigned an initial knowledge score of 204. Also, the members A, F and J have been statistically predicted to have a below average knowledge of the user 102 and each have been assigned an initial knowledge score of 206.

Note also that, in this embodiment, members D, H and K do not have knowledge score assigned thereto. This is because, in this example, the data mining used to determine the user's social network did not find enough information about these members D, H, K to reliably assign a knowledge score. Therefore, in this example, these members D, H, K were assigned no knowledge score, though in other examples, they may be assigned a very low knowledge score relative to the other members A, B, C, E, F, G, I and J.

The statistical data mining techniques could only provide a partial indication of the true knowledge scores of the members and the types of relationships between the members and the user. However, the accuracy of the assigned knowledge scores and the designated relationship types between the user and the members will improve as the example methods presented herein iterate through multiple cycles of surveying and knowledge score refining, as described in further detail below.

During each cycle, the members will be surveyed for an indication of which one or more options of digital content they expect would have a positive impression on the user. This surveying can include receiving, from each such member, a respective indication of which option(s) that member believes would have a positive impression on the user. Based on the surveying of the members, certain selected digital content, for instance digital content that based on the option, of the one or more options, most expected to have a positive impression on the user as informed from the surveying, is selected and presented to the user. The user is eventually prompted to provide, and the method receives, an indication from the user as to whether the selected digital content had a positive impression on the user. The knowledge score of each member is then updated based on the indication that was provided from that member in response to the surveying, and further based on the received indication from the user.

Figure 4:
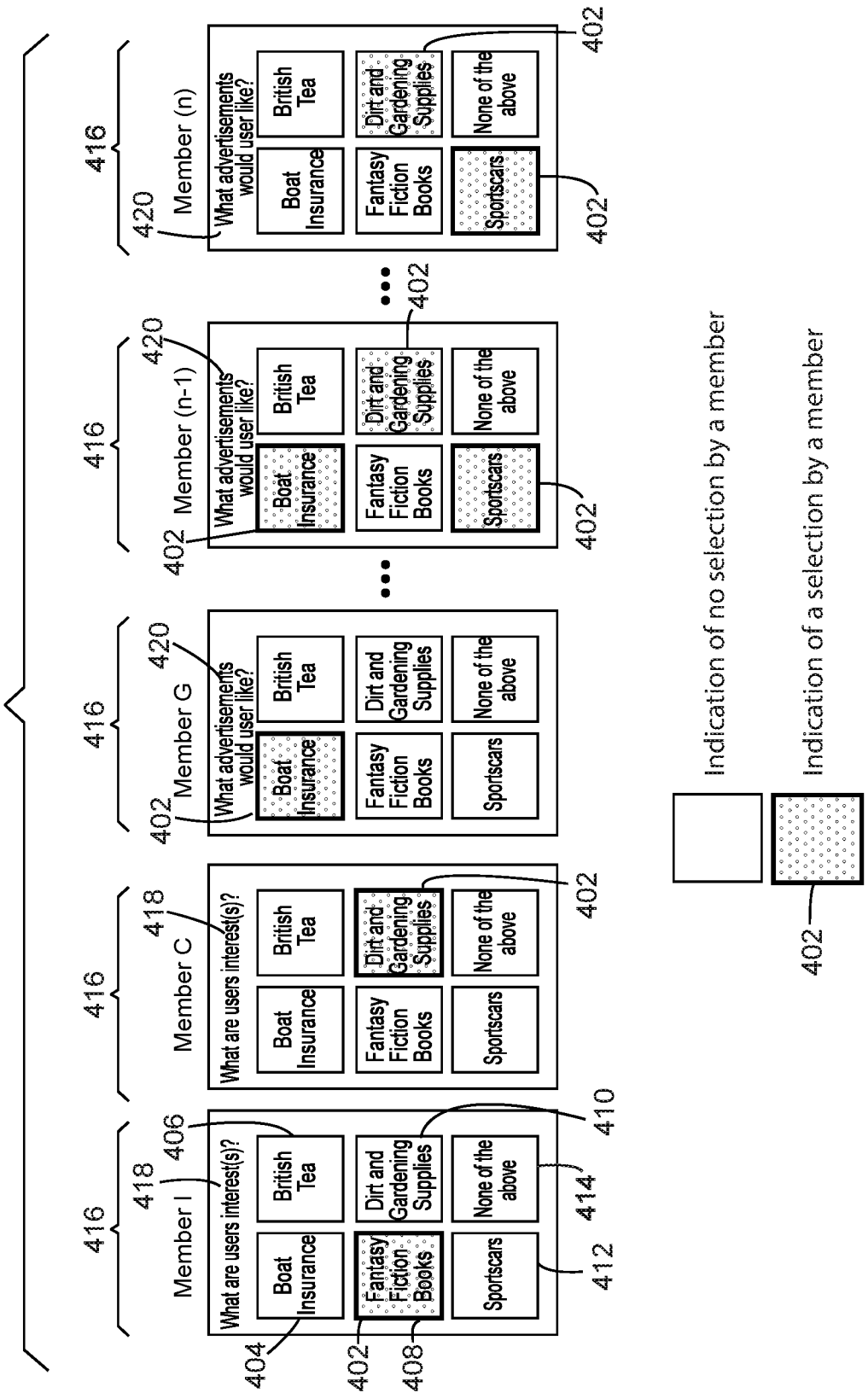
FIG. 4 depicts example options for digital content that are expected to have a positive impression on the user, the options being for presentation to the members of the social network in the form of a survey, according to aspects described herein.

FIG. 4 depicts example options for digital content that are expected to have a positive impression on the user, the options for presentation to the members of the social network in the form of a survey. Referring to FIG. 4, a diagram 400 of an exemplary form of a survey of the members is presented. In this case, the social network of the user 102 is assumed to include members A-K, plus an additional number of members up to a total of "n" number of members. Even though all of the members are surveyed, for purposes of simplifying this example, only the responses of members C, G, I, n−1 and n are shown.

The members (A-K, plus the remaining members up to member n) of the social network are surveyed for indications 402 of which one or more options 404, 406, 408, 410, 412, 414 of a plurality of options 416 for digital content, are expected to have a positive impression on the user 102. The surveying may take place on the computer systems of the members. For instance, the surveys may be disseminated electronically to the members as part of the social network feed or otherwise in an interface of the social network, and electronic responses obtained from those members electronically within the social network. In a particular example, the survey may be presented to the members as part of a log-in or verification (e.g. CAPTCHA) step in interacting with the social network.

The members (A-K and up to n) may be prompted by questions 418, 420. The questions may be the same for each member, as, for example, between members I and C. Alternatively, the questions may be different between members, as, for example, between members C and G.

The questions 418, 420 may reveal the identity of the user 102 to the members (A-K and up to n). Alternatively, the questions 418, 420 may not explicit reveal the identity of the user 102 to the members. One way of not explicitly revealing the identity of the user would be to ask questions about groups of individuals that have the same characteristics or relationships of the user relative to the member. For example, one could ask the question: "Would this ad appeal to your closest friends?" In some approaches, clusters of group questions could be asked such that the combination of answers from the members could be analyzed to reveal information specifically about the targeted user.

The plurality of options 416 for digital content may be based on aggregated data that is statistically relevant to a specific demographic group of which the user 102 is a part. Additionally, the particular plurality of options 416 for digital content presented to any given member may or may not be the same as the options 416 presented to other member(s).

The plurality of options 416 for digital content may include a plurality of advertisements presented to the members. As will be discussed in greater detail with reference to FIG. 5, the selected digital content that is presented to the user based on the survey may be or include one of the advertisements of the plurality of advertisements, or may be used to guide a product placement. For instance, the survey may ask whether the user would be interested in a first brand of laundry products, and, if answered yes, the user could be displayed a second brand of laundry products, or laundry products from a plurality of brands. Additionally or alternatively, the plurality of options 416 for digital content may indicate a plurality of topics on which digital content, such as an advertisement, may be based. For instance, a topic may be a subject matter topic or a category of products/services, for instance, on which an advertisement may be based. As will be discussed in greater detail with reference to FIG. 5, the selected digital content that is presented to the user based on the survey may include digital content that is directed to one topic of the plurality of topics.

In the specific example of FIG. 4, all of the questions 418, 420 used to prompt the members (A-K and up to n) reveal the identity of the user 102. However, the questions 418 posed to members C and I are different from the questions 420 posed to members G, n−1 and n.

Further, the one or more options for digital content 404, 406, 408, 410, 412, 414 out of the plurality of options 416 are not advertisements. Rather they indicate a plurality of topics to be selected by the members. Those topics in this particular case are as follows: "boat insurance", "British tea", "fantasy fiction books", "dirt and gardening supplies", "sports cars" and "none of the above."

Also in the specific example of FIG. 4, the indications from members I, C, G, n−1 and n of which one or more options are expected to have a positive impression on the user 102 are presented. Those indications are as follows:

for member I: "fantasy fiction books";
for member C: "dirt and gardening supplies";
for member G: "boat insurance";
for member (n−1): "boat insurance", "dirt and gardening supplies" and "sports cars"; and
for member (n): "dirt and gardening supplies" and "sports cars."

Figure 5:
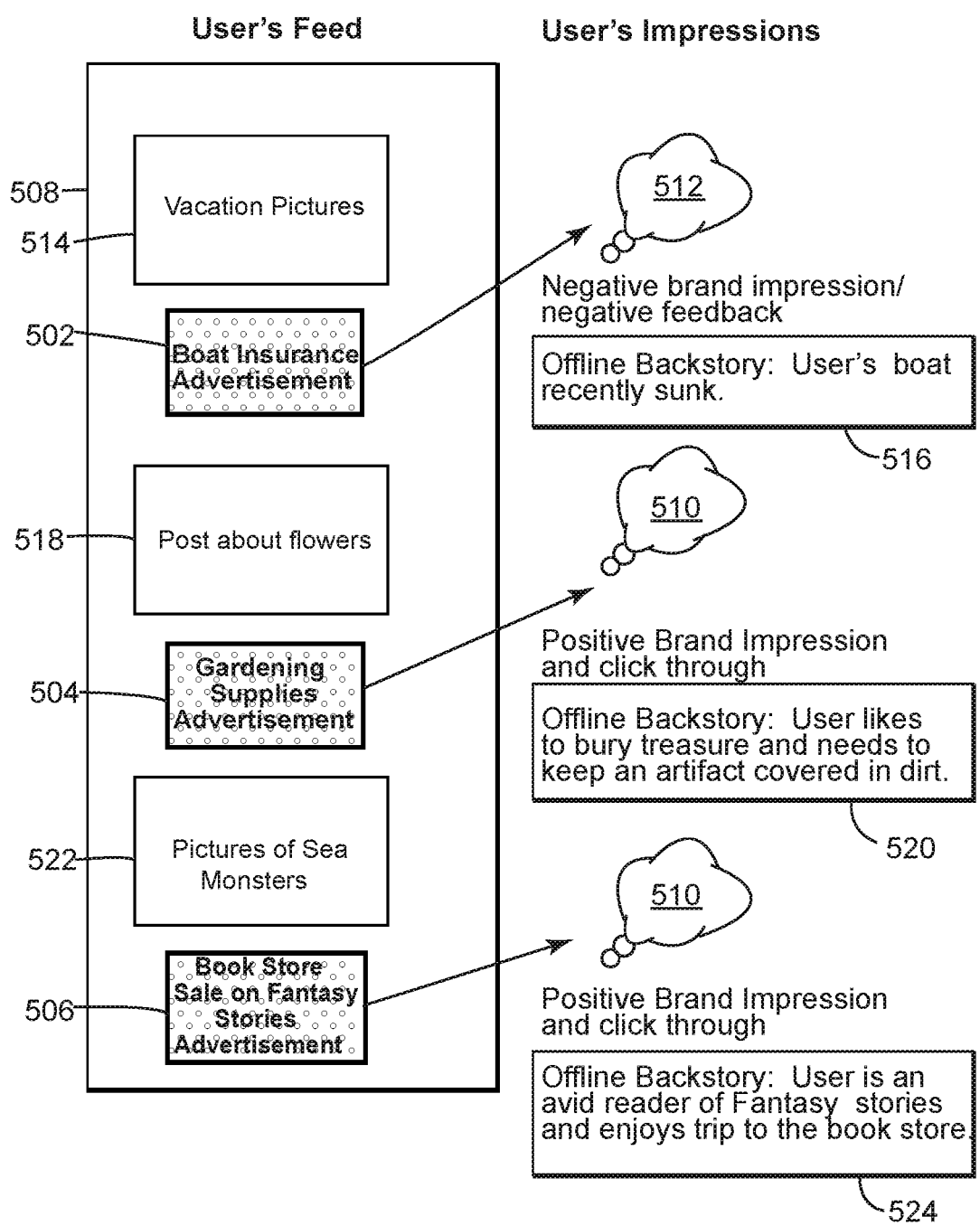
FIG. 5 depicts the presentation of digital content, selected based on the survey of FIG. 4, to the user in a social network feed of the user, and the user's indications of positive or negative impressions resulting from presentation of the selected digital content, according to aspects described herein.

FIG. 5 depicts the presentation of digital content, selected based on the survey of FIG. 4, to the user in a social network feed of the user, and the user's indications of positive or negative impressions resulting from presentation of the selected digital content. Selected digital content 502, 504, 506, that is based on the survey of FIG. 4, is presented to the user 102 in the user's social network feed 508 (for example through a graphic user interface or GUI) of the user 102. Also indicated are the positive and negative user impressions, e.g. positive impressions 510 and negative impression 512, resulting from presenting the selected digital content 502, 504, 506. It is noted that negative impressions can have different embodiments and degrees. A user may go out of the user's way to report an advertisement, which is likely a much greater negative impression than the negative impression gleaned from mere non-interaction or indication that that advertisement is irrelevant.

The selected digital content 502, 504, 506 is initially selected based on the surveying performed as described with reference to FIG. 4. The selected digital content 502, 504, 506 is based on the one or more options 402 that are expected to have a positive impression on the user 102, as indicated by the surveying process.

After the digital content 502, 504, 506 is selected based on the surveying, it is then presented to the user 102. In the example of FIG. 5, it is presented to the user as part of the user's social network data feed, though the digital content could alternatively or additionally be presented outside of the user's data feed, for instance in the form of banners, block advertisements, pop-ups, in-app advertisements, or the like. Targeted content could be reasonably embedded in any web design template or user interface, for instance. At the time of, or sometime after, presenting the digital content to the user, an indication of whether the selected digital 502, 504, 506 content had a positive impression 510 on the user, or a negative impression 512 on the user, is obtained/received. Obtaining this indication can be done in any of various ways. For instance, it could be done via direct querying (e.g. directly asking the user whether the displayed digital content is relevant to the user), focus tracking (tracking the focus of the user as the user interacts with the computer system, and/or via any other interactivity metrics, as examples.

Selecting the selected digital content 502, 504, 506 can be based on any one or more of several different factors. For example, selecting the selected digital content 502, 504, 506 may be based on some function of the indications 402 of which options for digital content would have a positive impression 510 on the user 102 that are received from the surveyed members. In some examples, this selecting includes applying greater weight to indications 402 of which options for digital content would have a positive impression 510 on the user 102 that are received from members with higher assigned knowledge scores, than indications 402 of which options for digital content would have a positive impression 510 on the user 102 that are received from members with lower knowledge scores. For example, greater weight may be applied to the indications 402 of selections from members I and G (which have an above average knowledge score 202 assigned to them in FIG. 3) than the indications 402 of selections from member C (which has an average knowledge score 204 assigned in FIG. 3).

Additionally or alternatively, selecting the selected digital content 502, 504, 506 may be based on indications 402 of which options for digital content would have a positive impression 510 on the user 102 that are received from members with knowledge scores that are above a predetermined threshold level. Additionally or alternatively, selecting the selected digital content 502, 504, 506 may exclude indications 402 of which options for digital content would have a positive impression 510 on the user 102 that are received from members with knowledge scores that are below the predetermined threshold level. For example, any indications from members D, H and K (which have a very low knowledge score or an unassigned knowledge score in FIG. 3) could be excluded from the selection process. Additionally, in some embodiments, only the indications from members that have a ranked knowledge score 202, 204, 206 (such as members A, B, C, E, F, G, I and J in FIG. 3) may be considered during the selection process.

In some aspects, the selecting process may be based on identifying the types of relationships between the user 102 and the members of the social network (such as professional, personal, family or similar) and then applying a weighting of those relationships depending on the types of questions being asked in the survey. More specifically, selecting the selected digital content 502, 504, 506 may be based on assigning weights to indications 402, from the members (A-K and up to n), of which options would have a positive impression 510 on the user 102, where a respective weight is assigned to each such indication 402 according to the relationship type between the user 102 and the member (A-K and up to n) providing that indication.

The selected digital content may be of any of several different types. For example, the selected digital content may include an advertisement that is selected from a plurality of advertisements, where the plurality of advertisements were included in the plurality of options during the surveying of the members. Additionally or alternatively, the selected digital content may include digital content directed to a topic of a plurality of topics, where the plurality of topics were included in the plurality of options during the surveying of the members.

In the example illustrated in FIG. 5, the selected digital content 502, 504, 506 are advertisements. The advertisements 502, 504, 506 were based on a plurality of options for digital content that indicated a plurality of topics 404, 406, 408, 410, 412, 414, from which the members had selected.

Looking specifically at the "boat insurance advertisement" 502 of FIG. 5, that advertisement 502 was selected from:

the indication 402 of member G that the topic of "boat insurance" 404 would have a positive impression 510 on the user 102; and the posting of vacation pictures 514 in the user's feed 508.

In the example of FIG. 5, the offline back-story 516 about the user's boat was that it recently sunk. Therefore, the user had a negative impression 512 to the advertisement 502.

Looking specifically at the "gardening supplies advertisement" 504 of FIG. 5, that advertisement 504 was selected from:

the indication 402 of member C and other members (at least members n-1 and n) that the topic of "dirt and gardening supplies" 410 would have a positive impression 510 on the user 102; and the posting about flowers 518 in the user's feed 508.

The offline back-story 520 is that the user likes to bury treasure and needs to keep an artifact covered in dirt. Therefore the user had a positive impression 510 to the advertisement 504.

Looking specifically at the "book store sale on fantasy stories advertisement" 506 of FIG. 5, that advertisement 506 was selected from:

the indication 402 of member I that the topic of "fantasy fiction books" 408 would have a positive impression 510 on the user 102; and the posting about pictures of sea monsters 522 in the user's feed 508.

The offline back-story 524 is that the user is an avid reader of fantasy stories and enjoys trips to the bookstore. Therefore the user had a positive impression 510 to the advertisement 506.

In this example, several selected digital content are provided in the user feed, though in other examples, only one (or no) digital content is selected based on the surveying. For instance, some function would rank the options for digital content based on an overall 'likeliness of positive impression' score, and the top-ranked option may be used to select one (or potentially more) digital content for presentation to the user.

The indications of negative impression 512 and positive impressions 510 that are received from the user 102 may come in any of a variety of forms. For example, the user 102 can be asked in a survey, the survey being similar to those used to survey the members for indications of which options 404, 406, 408, 410, 412, 414 of the plurality of options 416 would have a positive impression 510 on the user 102. Additionally or alternatively, it can be tracked whether the user clicked through on an advertisement for more detailed information, or if the user made a purchase based on an advertisement, to verify a positive impression 510 of that advertisement. Other approaches may also be used to obtain indications of user impressions of digital content presented to them.

Figure 6:
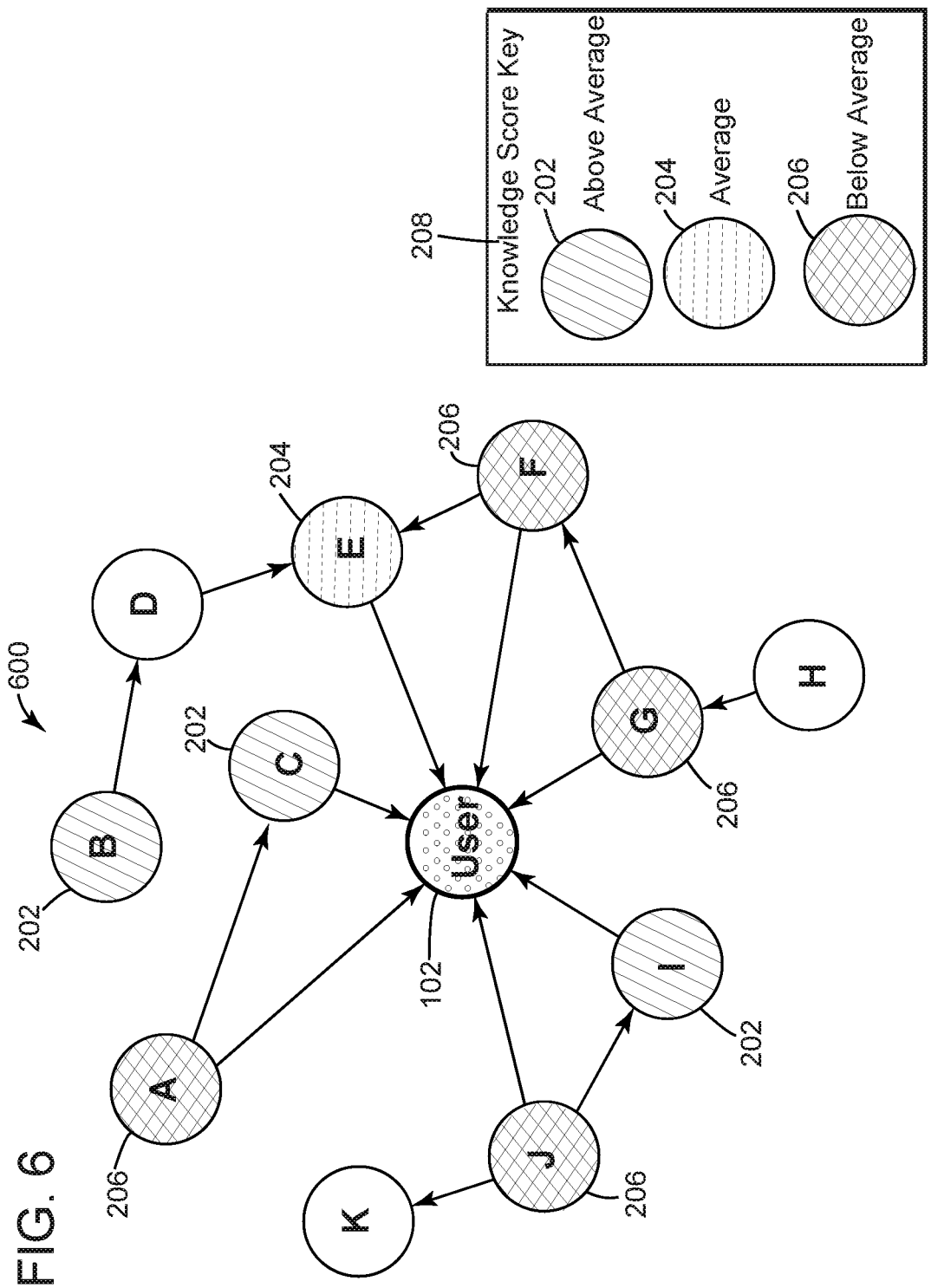
FIG. 6 depicts a social network graph of the social network of the user, in which the knowledge score assigned to each member has been updated based on the member's indication response to the survey of FIG. 4 and on received indications from the user of positive or negative impressions, according to aspects described herein.

Having obtained indications of the user's impressions of various digital content, that information may be used to refine the knowledge scores applied to the members of the user's social network. One example of such refining is using Bayesian inference, though auto-regressive moving average, Kalman filtering, and/or any one or more of various update methods could be used. The indication of the user's impression can serve to validate or invalidate, as the case may be, the different member's indications as to which options for digital content those members indicated would result in a positive impression on the user. In other words, to the extent that a user's indication about the impression he or she gets from a piece of digital content conflicts with or validates a member's indication about what digital content option(s) would have a positive or negative impression on the user, that member's assigned knowledge score may be modified to reflect more or less accuracy in that member's ability to correctly indicate the impression digital content will have on the user. FIG. 6 depicts a social network graph 600 of the social network of the user, in which the knowledge score assigned to each member has been updated based on the member's indication response to the survey of FIG. 4 and on received indications of positive or negative impressions from the user. The updating of each member A-K's knowledge score is based on the indication from that member A-K that was received in response to the survey. The updating is further based on the received indications from the user as to whether the user had a positive response 510 or negative response 512. For instance, if a member indicated that the option "boat insurance" would have a positive impression on the user but, as depicted in FIG. 5, a boat insurance advertisement was not well received by the user, then that member's knowledge score may be lowered or diminished to some extent to indicate less accuracy of that member in correctly identifying the impressions of the users.

Note that the indications that are used to update the knowledge scores of the members A-K are not necessarily the same indications that are provided by the members A-K as to which one or more options are expected to have a positive impression on the user. A member may choose the option of "none of the above" or choose not to respond at all to the survey of FIG. 4. A 'none of the above' or a non-response to the survey may still be considered an indication from that member, for purposes of updating the knowledge scores.

In the specific example of FIG. 6, the knowledge score of member C has been upgraded from average 204 (see FIG. 3) to above average 202 in FIG. 6. Further, the knowledge score of member G has been downgraded from above average 202 (see FIG. 3) to below average 206 in FIG. 6. Finally, the knowledge score of member I remains the same at above average 206.

Note that after the updating of the knowledge scores, the knowledge scores in graph 600 are now closer than graph 300 (FIG. 3) to the true knowledge scores in graph 200 (FIG. 2). However, graph 600 can still be significantly improved by, for example, obtaining enough information to assign a knowledge score to members D, H and K.

Note also, the types of relationships between the user and the other members of the social network can also be updated with this process. Such updating can increase the accuracy of future predictions. It can also increase knowledge of the types of relationships between groups, as well as facilitate the clustering groups of users with similar knowledge scores and responses about a single user. Work colleagues might be well-versed in one's technical capabilities and career aspirations, while soccer teammates might know what soccer teams the individual likes to follow, and family members might know more intimate details, as examples.

Once the updating of the knowledge scores is complete, a first cycle of the example method has been completed. The process can then iterate. That is, the surveying, the selecting, the presenting, the receiving, and the updating may be iterated for one or more additional plurality of options for other digital content. The iterating improves accuracy in selecting digital content that has a positive impression on the user. Additionally, the iterations enable the knowledge scores assigned to the members A-K to more closely approach the true knowledge scores of those members A-K depicted in graph 200 of FIG. 2.

Figure 7:
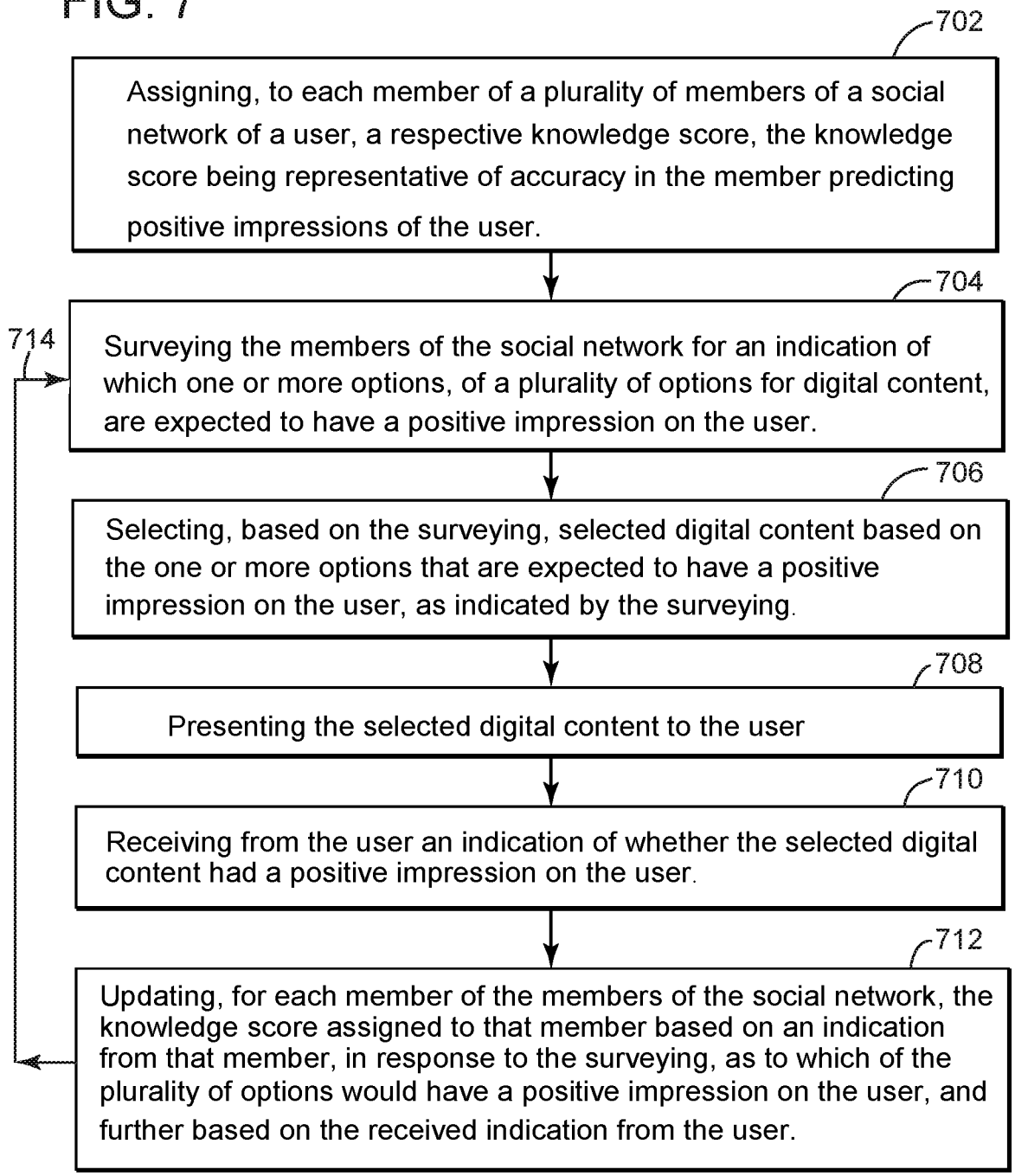
FIG. 7 depicts an example process of using a social network of a user to enhance the accuracy of targeted digital content presentation, according to aspects described herein.

FIG. 7 depicts an example process of using a social network of a user to enhance the accuracy of targeted digital content presentation, in accordance with aspects described herein. The process utilizes a social network to enhance targeted digital content (e.g. advertising) presentation, for instance. In some examples, the process is performed by one or more computer systems, such as those described herein, which may include one or more servers, such as those of or hosting a social network computer infrastructure, or other computers in communication with those of a social network infrastructure, one or more cloud servers, and/or one or more other computer systems.

The process begins by assigning, to each member of a plurality of members of a social network of a user, a respective knowledge score (702). The knowledge score is representative of accuracy in the member predicting positive impressions of the user.

The process continues by surveying the members of the social network for an indication of which one or more options, of a plurality of options for digital content, are expected to have a positive impression on the user (704).

Based on the surveying, the process selects the selected digital content (706). The selected digital content is selected based on the one or more options that are expected to have a positive impression on the user, as indicated by the surveying. The process presents the selected digital content to the user (708) and, eventually, receives from the user an indication of whether the selected digital content had a positive impression on the user (710).

The process then updates, for each member of the members of the social network, the knowledge score assigned to that member (712). The updating is based on an indication from that member, in response to the surveying, as to which of the plurality of options would have a positive impression on the user. The updating is further based on the received indication from the user.

The process then iterates (as illustrated by arrow 714) by returning to 704 to repeat the surveying, selecting (706), presenting (708), receiving (710) and updating (712). The process can repeat any number of times. At each iteration, an additional plurality of options for other digital content is presented by the surveying (704). It is noted that the set of members surveyed at each iteration may or may not vary from each other. The social network of a user changes over time as friends or connections come and go. Additionally, it may be desired, especially in situations where a user has an extensive social network, to survey only the members 'closest' to the user in the social network, and that set of members may change over time, especially as the knowledge scores of those members becomes refined to identify those members with the best knowledge of the user. Based on the different options presented at each iteration, different selections are made from different options, different digital content is presented to the user and different users impressions thereof are obtained, and knowledge scores are further refined based on this new information. The iterating ultimately improves accuracy in selecting digital content that has a positive impression on the user because the knowledge scores reflect with increasing accuracy which members most accurately identify the impressions a user will have to digital content. Selections for digital content to present to the user can thereby be made more accurate in terms of selecting content to present that is more likely to have a positive impression on the user.

Although various examples are provided, variations are possible without departing from a spirit of the claimed aspects.

Figure 8:
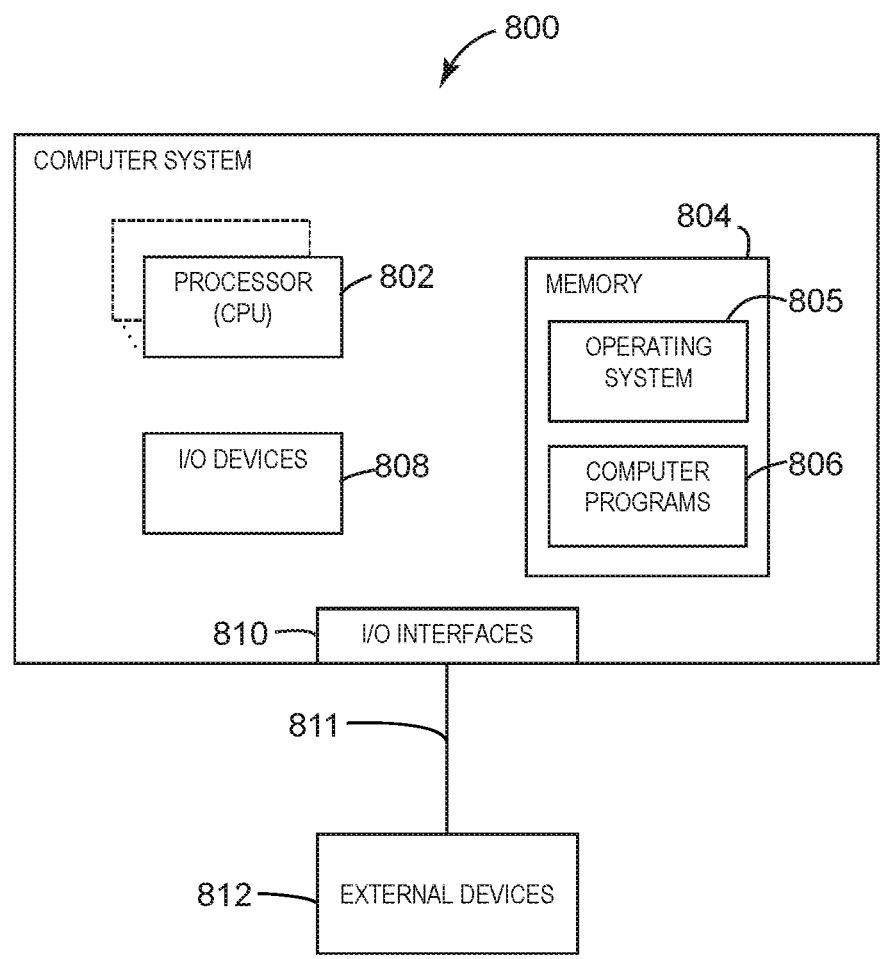
FIG. 8 depicts one example of a computer system and associated devices to incorporate and/or use aspects described herein.

Processes described herein may be performed singly or collectively by one or more computer systems, such as one or more cloud servers, computing systems, or combination of the forgoing, as examples. FIG. 8, depicts one example of such a computer system and associated devices to incorporate and/or use aspects described herein. A computer system may also be referred to herein as a data processing device/system, computing device/system/node, or simply a computer. The computer system may be based on one or more of various system architectures and/or instruction set architectures, such as those offered by International Business Machines Corporation (Armonk, N.Y., USA), Intel Corporation (Santa Clara, Calif., USA) or ARM Holdings plc (Cambridge, England, United Kingdom), as examples.

FIG. 8 shows a computer system 800 in communication with external device(s) 812. Computer system 800 includes one or more processor(s) 802, for instance central processing unit(s) (CPUs). A processor can include functional components used in the execution of instructions, such as functional components to fetch program instructions from locations such as cache or main memory, decode program instructions, and execute program instructions, access memory for instruction execution, and write results of the executed instructions. A processor 802 can also include register(s) to be used by one or more of the functional components. Computer system 800 also includes memory 804, input/output (I/O) devices 808, and I/O interfaces 810, which may be coupled to processor(s) 802 and each other via one or more buses and/or other connections. Bus connections represent one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 804 can be or include main or system memory (e.g. Random Access Memory) used in the execution of program instructions, storage device(s) such as hard drive (s), flash media, or optical media as examples, and/or cache memory, as examples. Memory 804 can include, for instance, a cache, such as a shared cache, which may be coupled to local caches (examples include L1 cache, L2 cache, etc.) of processor(s) 802. Additionally, memory 804 may be or include at least one computer program product having a set (e.g., at least one) of program modules, instructions, code or the like that is/are configured to carry out functions of embodiments described herein when executed by one or more processors.

Memory 804 can store an operating system 805 and other computer programs 806, such as one or more computer programs/applications that execute to perform aspects described herein. Specifically, programs/applications can include computer readable program instructions that may be configured to carry out functions of embodiments of aspects described herein.

Examples of I/O devices 808 include but are not limited to microphones, speakers, Global Positioning System (GPS) devices, cameras, lights, accelerometers, gyroscopes, magnetometers, sensor devices configured to sense light, proximity, heart rate, body and/or ambient temperature, blood pressure, and/or skin resistance, and activity monitors. An I/O device may be incorporated into the computer system as shown, though in some embodiments an I/O device may be regarded as an external device (812) coupled to the computer system through one or more I/O interfaces 810.

Computer system 800 may communicate with one or more external devices 812 via one or more I/O interfaces 810. Example external devices include a keyboard, a pointing device, a display, and/or any other devices that enable a user to interact with computer system 800. Other example external devices include any device that enables computer system 800 to communicate with one or more other computing systems or peripheral devices such as a printer. A network interface/adapter is an example I/O interface that enables computer system 800 to communicate with one or more networks, such as a local area network (LAN), a general wide area network (WAN), and/or a public network (e.g., the Internet), providing communication with other computing devices or systems, storage devices, or the like. Ethernet-based (such as Wi-Fi) interfaces and Bluetooth® adapters are just examples of the currently available types of network adapters used in computer systems (BLUETOOTH is a registered trademark of Bluetooth SIG, Inc., Kirkland, Wash., U.S.A.).

The communication between I/O interfaces 810 and external devices 812 can occur across wired and/or wireless communications link(s) 811, such as Ethernet-based wired or wireless connections. Example wireless connections include cellular, Wi-Fi, Bluetooth®, proximity-based, near-field, or other types of wireless connections. More generally, communications link(s) 811 may be any appropriate wireless and/or wired communication link(s) for communicating data.

Particular external device(s) 812 may include one or more data storage devices, which may store one or more programs, one or more computer readable program instructions, and/or data, etc. Computer system 800 may include and/or be coupled to and in communication with (e.g. as an external device of the computer system) removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media.

Computer system 800 may be operational with numerous other general purpose or special purpose computing system environments or configurations. Computer system 800 may take any of various forms, well-known examples of which include, but are not limited to, personal computer (PC) system(s), server computer system(s), such as messaging server(s), thin client(s), thick client(s), workstation(s), laptop(s), handheld device(s), mobile device(s)/computer(s) such as smartphone(s), tablet(s), and wearable device(s), multiprocessor system(s), microprocessor-based system(s), telephony device(s), network appliance(s) (such as edge appliance(s)), virtualization device(s), storage controller(s), set top box(es), programmable consumer electronic(s), network PC(s), minicomputer system(s), mainframe computer system(s), and distributed cloud computing environment(s) that include any of the above systems or devices, and the like.

Aspects described herein may be incorporated into and/or use a cloud computing environment. It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes. One such node is node 910 depicted in FIG. 9.

Computing node 910 is only one example of a suitable cloud computing node and is not intended to suggest any limitation as to the scope of use or functionality of embodiments of the invention described herein. Regardless, cloud computing node 910 is capable of being implemented and/or performing any of the functionality set forth hereinabove.

Figure 9:
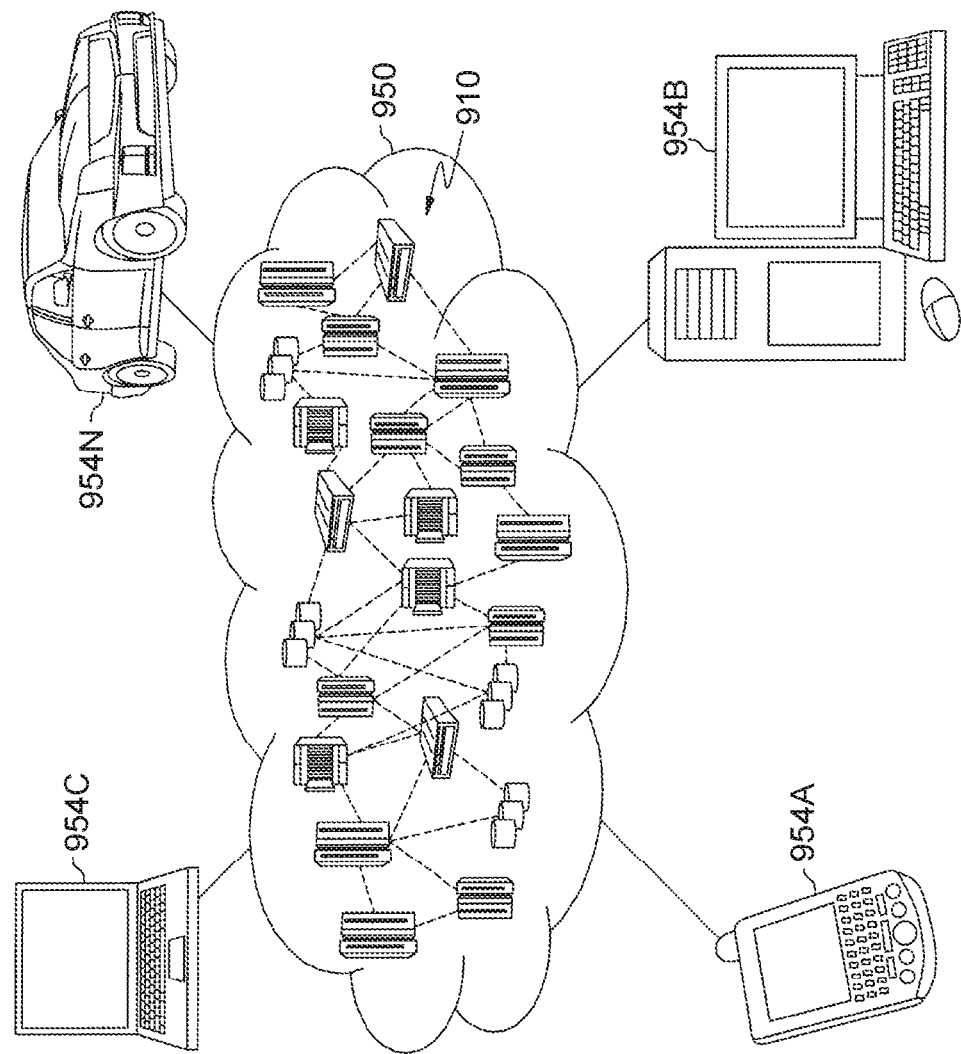
FIG. 9 depicts a cloud computing environment according to aspects described herein.

Referring now to FIG. 9, illustrative cloud computing environment 950 is depicted. As shown, cloud computing environment 950 comprises one or more computing nodes 910 with which local computing devices used by cloud consumers, such as, for example, smartphone or other mobile device 954A, desktop computer 954B, laptop computer 954C, and/or automobile computer system 954N may communicate. Nodes 910 may communicate with one another. They may be grouped (not shown) physically or virtually, in one or more networks, such as Private, Community, Public, or Hybrid clouds as described hereinabove, or a combination thereof. This allows cloud computing environment 950 to offer infrastructure, platforms and/or software as services for which a cloud consumer does not need to maintain resources on a local computing device. It is understood that the types of computing devices 954A-N shown in FIG. 9 are intended to be illustrative only and that computing nodes 910 and cloud computing environment 950 can communicate with any type of computerized device over any type of network and/or network addressable connection (e.g., using a web browser).

Figure 10:
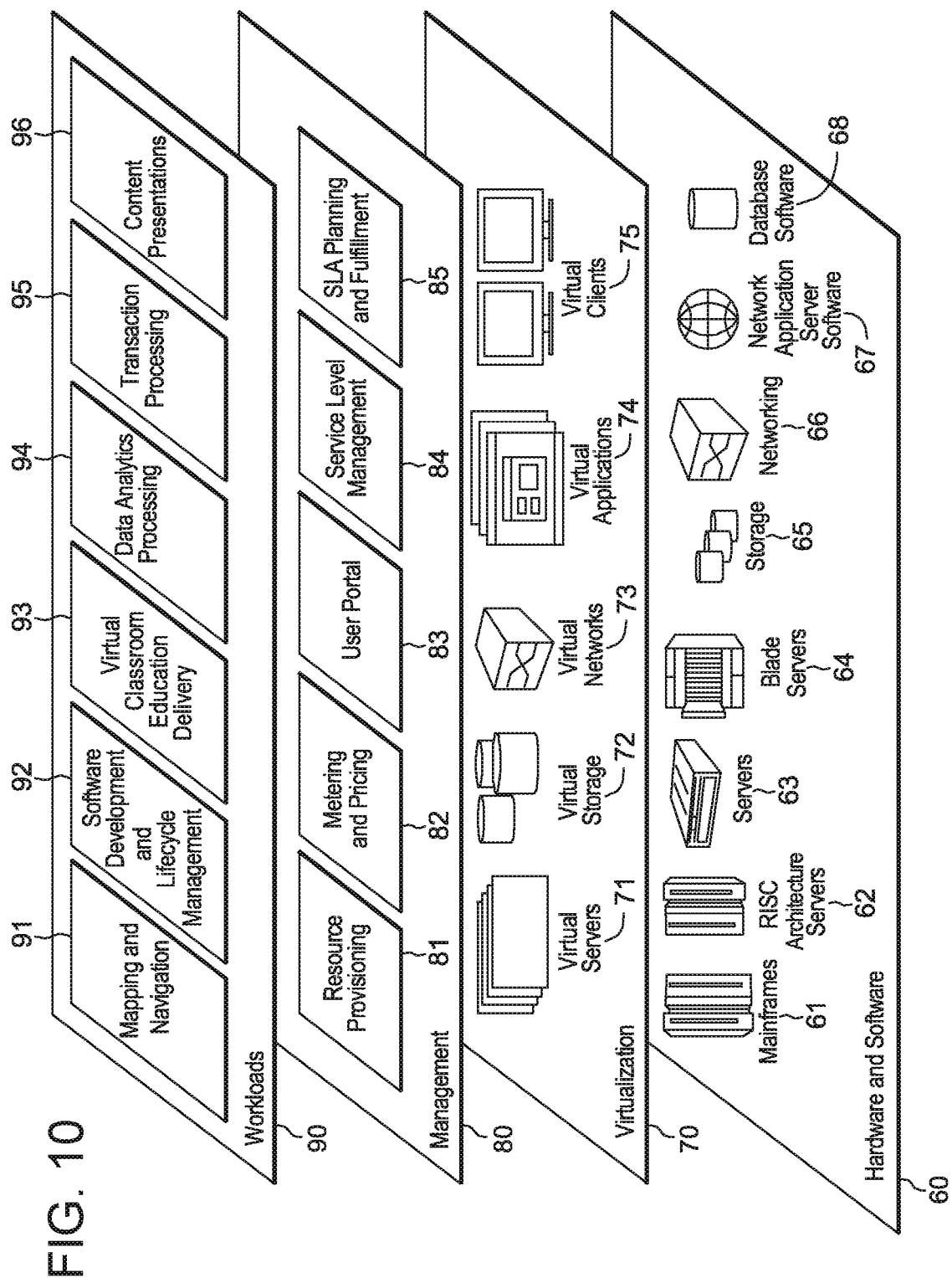
FIG. 10 depicts abstraction model layers according to aspects described herein.

Referring now to FIG. 10, a set of functional abstraction layers provided by cloud computing environment 950 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and content presentation 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although various embodiments are described above, these are only examples. For example, computing environments of other architectures can be used to incorporate and use one or more embodiments.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer implemented method comprising:

analyzing, by one or more computer systems, a social network graph of a social network of a user and social media content;

based on the analyzing the social network graph and the social media content, identifying, by the one or more computer systems, a plurality of members of the social network of the user and associations between the plurality of members and the user, including relationship types between the plurality of members and the user;

assigning, by the one or more computer systems, to each member of the plurality of members, a respective knowledge score, the knowledge score being representative of accuracy in the member predicting positive impressions of the user, wherein the assigning is based on the identified associations and relationship types;

selecting, by the one or more computer systems, which members, of the plurality of members, to survey based on the identified associations;

transmitting, by the one or more computer systems, surveys to the selected members via the social network, each member receiving at least one survey;

receiving, by the one or more computers, responses to the surveys, the responses comprising a combined knowledge of the surveyed selected members gleaned from the responses to gather an offline back story pertaining to the user, and indications of which one or more options of a plurality of digital content are expected to have a positive impression on the user;

based on receiving the responses to the surveys, selecting, by the one or more computer systems, digital content based on the one or more options that are expected to have a positive impression on the user, wherein the selecting is based on applying greater weight to one or more indications, of the indications of which one or more options for digital content are expected to have a positive impression on the user, from a subset of members, of the selected members, having greater knowledge scores assigned thereto;

transmitting, by the one or more computer systems, the selected digital content to the user via the social network;

receiving, by the one or more computer systems, feedback from the user of whether the selected digital content had a positive impression on the user; and based on receiving the feedback from the user, updating, by the one or more computer systems, the respective knowledge score assigned to each member of one or more members of the selected members.

2. The method of claim 1, further comprising iterating the transmitting surveys, the receiving responses, the selecting digital content, the transmitting the selected digital content, the receiving feedback, and the updating, for one or more other options of another plurality of digital content, wherein the iterating improves accuracy in selecting digital content that has a positive impression on the user.

3. The method of claim 1, wherein the assigning the knowledge scores comprises, for each member of the plurality of members of the social network, assigning the respective knowledge score based on statistical data mining applied to the social network, the statistical data mining providing an initial indication of accuracy in that member predicting positive impressions of the user.

4. The method of claim 1, wherein the surveys to the selected members does not reveal than identity of user to the members.

5. The method of claim 1, wherein the selecting the digital content is further based on indications of which options for digital content would have a positive impression on the user that are received from members with knowledge scores that are above a predetermined threshold level, and excludes indications of which options for digital content would have a positive impression on the user that are received from members with knowledge scores that are below the predetermined threshold level.

6. The method of claim 1, wherein the plurality of digital content comprise a plurality of advertisements and the selected digital content comprises one advertisement of the plurality of advertisements.

7. The method of claim 1, wherein the plurality of digital content indicate a plurality of topics and the selected digital content comprises digital content directed to one topic of the plurality of topics.

8. The method of claim 1, wherein the plurality of digital content is based on aggregated data that is statistically relevant to a specific demographic group of which the user is a part.

9. A computer system comprising:

a memory; and a processor in communication with the memory, wherein the computer system is configured to perform a method comprising:

analyzing, by the computer system, a social network graph of a social network of a user and social media content;

based on the analyzing the social network graph and the social media content, identifying, by the computer system, a plurality of members of the social network of the user and associations between the plurality of members and the user, including relationship types between the plurality of members and the user;

assigning, by the computer system, to each member of the plurality of members, a respective knowledge score, the knowledge score being representative of accuracy in the member predicting positive impressions of the user, wherein the assigning is based on the identified associations and relationship types;

selecting, by the computer system, which members, of the plurality of members, to survey based on the identified associations;

transmitting, by the computer system, surveys to the selected members via the social network, each member receiving at least one survey;

receiving, by the computer system, responses to the surveys, the responses comprising a combined knowledge of the surveyed selected members gleaned from the responses to gather an offline back story pertaining to the user, and indications of which one or more options of a plurality of digital content are expected to have a positive impression on the user;

based on receiving the responses to the surveys, selecting, by the computer system, digital content based on the one or more options that are expected to have a positive impression on the user, wherein the selecting is based on applying greater weight to one or more indications, of the indications of which one or more options for digital content are expected to have a positive impression on the user from a subset of members, of the selected members, having greater knowledge scores assigned thereto;

transmitting, by the computer system, the selected digital content to the user via the social network;

receiving, by the computer system, feedback from the user whether the selected digital content had a positive impression on the user; and based on receiving the feedback from the user, updating, by the one or more computer systems, the respective knowledge score assigned to each member of one or more members of the selected members.

10. The computer system of claim 9, wherein the method further comprises iterating the transmitting surveys, the receiving responses, the selecting digital content, the transmitting the selected digital content, the receiving feedback, and the updating, for one or more other options of another plurality of digital content, wherein the iterating improves accuracy in selecting digital content that has a positive impression on the user.

11. The computer system of claim 9, wherein the selecting the digital content is further based on indications of which options for digital content would have a positive impression on the user that are received from members with knowledge scores that are above a predetermined threshold level, and excludes indications of which options for digital content would have a positive impression on the user that are received from members with knowledge scores that are below the predetermined threshold level.

12. A computer program product comprising:
a computer readable storage medium readable by at least one processor and storing instructions for execution by the at least one processor for performing a method comprising:

analyzing, by one or more computer systems, a social network graph of a social network of a user and social media content;

based on the analyzing the social network graph and the social media content, identifying, by the one or more computer systems, a plurality of members of the social network of the user and associations between the plurality of members and the user, including relationship types between the plurality of members and the user;

assigning, by the one or more computer systems, to each member of the plurality of members, a respective knowledge score, the knowledge score being representative of accuracy in the member predicting positive impressions of the user, wherein the assigning is based on the identified associations and relationship types;

selecting, by the one or more computer systems, which members, of the plurality of members, to survey based on the identified associations;

transmitting, by the one or more computer systems, surveys to the selected members via the social network, each member receiving at least one survey;

receiving, by the one or more computer systems, responses to the surveys, the responses comprising a combined knowledge of the surveyed selected members gleaned from the responses to gather an offline back story pertaining to the user, and indications of which one or more options of a plurality of digital content are expected to have a positive impression on the user;

based on receiving the responses to the surveys, selecting, by the one or more computer systems, digital content based on the one or more options that are expected to have a positive impression on the user, wherein the selecting is based on applying greater weight to one or more indications, of the indications of which one or more options for digital content are expected to have a positive impression on the user from a subset of members, of the selected members, having greater knowledge scores assigned thereto;

transmitting, by the one or more computer systems, the selected digital content to the user via the social network;

receiving, by the one or more computer systems, feedback from the user of whether the selected digital content had a positive impression on the user; and based on receiving the feedback from the user, updating, by the one or more computer systems, the respective knowledge score assigned to each member of one or more members of the selected members.

13. The computer program product of claim 12, wherein the method further comprises iterating the transmitting surveys, the receiving responses, the selecting digital content, the transmitting the selected digital content, the receiving feedback, and the updating, for one or more other options of another plurality of digital content, wherein the iterating improves accuracy in selecting digital content that has a positive impression on the user.

* * * * *